H. T. HOLBROOK & R. H. POOLER.
Road-Engine.

No. 212,226. Patented Feb. 11, 1879.

Witnesses
Geo. H. Strong
Frank A. Brooks

Inventors
Henry T. Holbrook and
Ruxton H. Pooler
By Dewey & Co. attys

UNITED STATES PATENT OFFICE.

HENRY T. HOLBROOK AND RUXTON H. POOLER, OF HALF MOON BAY, CALIFORNIA.

IMPROVEMENT IN ROAD-ENGINES.

Specification forming part of Letters Patent No. 212,226, dated February 11, 1879; application filed September 23, 1878.

*To all whom it may concern:*

Be it known that we, HENRY T. HOLBROOK and RUXTON H. POOLER, of Half Moon Bay, county of San Mateo, and State of California, have invented an Improved Road and Field Locomotive; and we do hereby declare the following to be a full, clear, and exact description thereof, reference being had to the accompanying drawings.

Our invention relates to an improved road and field locomotive and traction-engine for drawing agricultural implements and loaded wagons over fields or roads; and our improvement consists in a novel combination and arrangement of devices, hereinafter explained and claimed.

Figure 1:
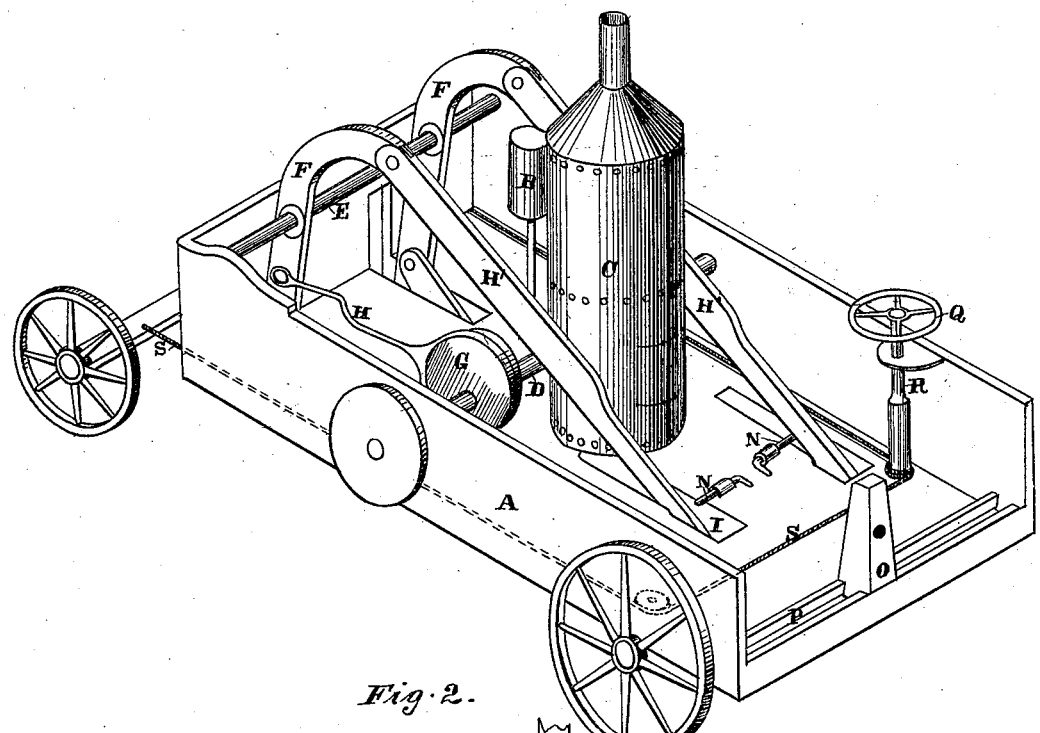
Figure 2:
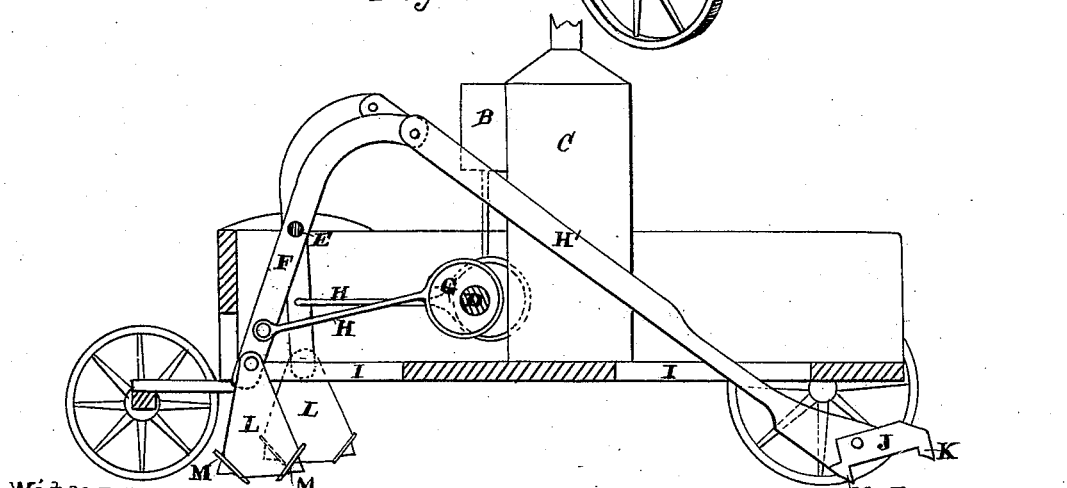

Referring to the accompanying drawings for a more complete explanation of our invention, Figure 1 is a perspective view of our apparatus. Fig. 2 is a longitudinal section.

Let A represent a truck or body, mounted on four wheels, as shown, the axle supporting the front wheels being capable of turning, so as to steer the apparatus in the direction required. On the truck or body is mounted an engine, B, and boiler C, as shown, the engine being connected to the horizontal shaft D, extending across the truck at right angles to the line of motion. At a suitable distance forward of and parallel with the engine-shaft D is a stationary shaft, E, which supports two or more arms, F, in nearly a vertical position, and at such an altitude above the line of the engine-shaft as will be equal to about one-third of the length of the arm. These arms F are mounted at a point which is their true center on journals at proper distances apart on the stationary shaft, and are placed at such an angle as to give them a vertical position only when they shall be opposite to the short point of their respective eccentrics, which will determine the length of their eccentric-rods. The eccentrics or cranks G are secured to the engine-shaft in the usual manner, and the eccentric-rods, H, attached to them are also secured to the arms F, as shown, so that the rotation of the engine-shaft will move the arms F backward and forward, as hereinafter described. The eccentric-rods are attached to the arms F by wrist-connections in a line with the engine-shaft, and at a point on the said arms equal to about one-sixth of the entire length of the arms as measured from the lower ends. The rods are attached to the eccentrics at opposite points, in the usual manner.

The upper ends of the arms F are curved backward, forming an angle from their center, of which the hypotenuse is equal to their length below their center, or one-half of the entire length of the arm. At the end of each, and at equal distances from the center of the arms F, is hinged or pivoted a leg, H', which extends backward and over the engine-shaft at an angle which allows it to project through a slot, I, in the bottom of the truck toward the ground. To the lower end is pivoted or hinged a peculiarly-shaped self-adjusting shoe, J, resting upon the ground, and kept there by its own gravity, thus accommodating itself to all irregularities of the surface over which the machine moves. The shoe J is formed of iron bars in the shape of a parallelogram, in which are a suitable number of holes for the insertion of hardened steel points K, which penetrate the ground and prevent the shoe from slipping. The shoe is attached by a knuckle-joint to the leg in such a manner that its weight will cause it to adjust itself to the inequalities of the ground at each step, and present a broad rough surface that will neither slip over nor sink into the ground to any material extent. Any number of points K may be used that may be considered necessary, and they may be replaced when broken or worn out.

To the lower ends of the arms F are pivoted or hinged the forward legs, L, in such a manner that they can be thrown entirely over in their connection to a reverse position, so as to push the apparatus backward when necessary. The lower ends of these legs L are so formed as to admit of attaching a double pair of shoes, M, to each leg, so that one pair acts in going forward and the other in going backward. In order to accomplish this, the two sets of shoes on each leg are hinged at opposite angles to each other, as shown.

In backing the machine it will be necessary to throw the hind legs out of gear—that is, they must be held up off the ground. The slot I is made long enough, so that the legs may be set back far enough to keep them off the ground, and pins N are placed under them to hold them in that position while the apparatus is being backed. When going ahead again the pins are withdrawn and the legs allowed to drop, so that their shoes again touch the ground, as herein described.

A samson-post, O, at the rear end of the truck, by which plows, harrows, &c., may be attached, is arranged to slide in a groove or slot, P, so that it may be moved to any desired point. A hand-wheel, Q, attached to a vertical shaft or cylinder, R, on which are the steering-ropes S, fastened to opposite ends of the front axle, serves as a means to direct the course of the machines.

The alternating oscillating motion of the arms F upon their journals on the shaft E imparts to the legs at each end a rectilinear motion, which, by reason of their having no support at their extremities, fall to the ground by their own gravity, and the said rectilinear motion, that would be otherwise produced if the legs were supported at their ends, is changed to an angular leverage or pawl-motion similar to that of the legs of a quadruped when walking, thus propelling the machine a distance proportionate to the stroke obtained from the eccentric at each revolution of the engine furnishing the power.

By the combination of mechanism and peculiar position of the arms an oscillating motion is given to the arms in such a manner as to cause the line of motion of each extremity of the said arms to describe a segment of a circle; and as one-half of the said segment so described would be out of the line of draft or power should said arms be placed in a vertical position, then the power so applied would not be perfectly utilized, because the center and longest part of the segment would be immediately under the weight to be driven forward, and would consequently have a tendency, in passing the center of the segment, to raise the weight instead of driving it in either direction, we have therefore so placed the arms upon their journals as to remove the center of said segment of a circle described by the arms when oscillating to a point forward of the weight and in the line of draft or power. In this manner the pressure exerted is entirely in the line of draft. The legs are arranged, as described, to descend an uncertain distance, so as to accommodate themselves to inequalities of the ground. In case there is a hillock, the leg will not go so low, and in case of a depression or hollow the leg will fall low enough for the shoe to gain a hold at the bottom of the depression.

This device is intended to haul or tow any agricultural implement, such as plows, harrows, and the like, and will also draw loaded wagons either in an ordinary field or on a common road. It will readily pass over any ground suitable for horses to work upon when performing similar labor. When the propelling devices are thrown out of gear, belt-connections may be made with the engine-shaft and the power utilized for hoisting, thrashing, sawing, pumping, and similar work, such as may be done by a portable or stationary engine.

Having thus described our invention, what we claim as new, and desire to secure by Letters Patent, is—

The connecting rods or bars H, having the feet J hinged to their lower ends, while their upper ends connect with the arms F, in combination with the sliding bolt N, by which the rear feet may be elevated from the ground when the machine is moved backward, substantially as herein described.

In witness whereof we hereunto set our hands.

H. T. HOLBROOK.
RUXTON HENRY POOLER.

Witnesses:
GEO. H. STRONG,
FRANK A. BROOKS.